M. F. CHEVALIER.
BATH SPRAY.
APPLICATION FILED SEPT. 22, 1919.

1,374,430.

Patented Apr. 12, 1921.

INVENTOR.
Mary F. Chevalier
BY
Hazard & Miller
ATTORNEYS

UNITED STATES PATENT OFFICE.

MARY F. CHEVALIER, OF BALDWIN PARK, CALIFORNIA.

BATH-SPRAY.

1,374,430.

Specification of Letters Patent.   Patented Apr. 12, 1921.

Application filed September 22, 1919.  Serial No. 325,532.

*To all whom it may concern:*

Be it known that I, MARY FRANCES CHEVALIER, a citizen of the United States, residing at Baldwin Park, in the county of Los Angeles and State of California, have invented new and useful Improvements in Bath-Sprays, of which the following is a specification.

My object is to make an improved bath spray, and my invention consists of the novel features herein shown, described and claimed.

Figure 1:
Figure 1 is a perspective of a bath spray embodying the principles of my invention in use.
Figure 2:
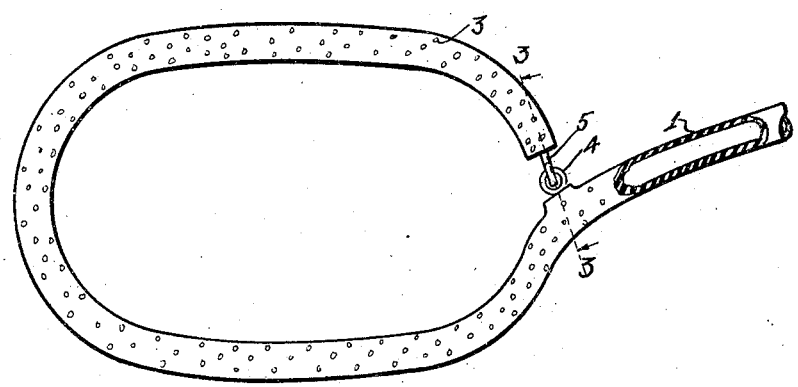
Fig. 2 is a bottom plan view of the bath spray, parts being broken away and shown in section.

The soft flexible hose 1 is adapted to be connected directly to a faucet 2, and the opposite end of the hose 1 from the faucet 2 has fine perforations 3 in its lower face, and the perforated portion is long enough to reach around the neck of a user and rest upon the shoulders.

An eye 4 is attached to the hose 1 at one end of the perforated portion, and a hook 5 is attached to the hose at the other end of the perforated portion, so that when the perforated portion is placed around the neck the hook 5 engages the eye 4 and holds the perforated portion 3 in the form of a loop.

Figure 3:
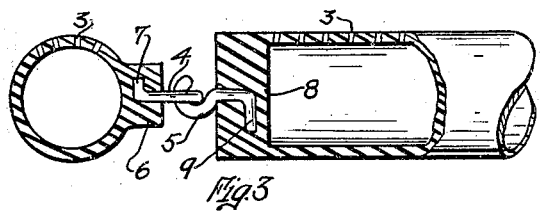
Fig. 3 is a sectional detail on the line 3—3 of Fig. 2.

In Fig. 3 a boss 6 is formed upon the hose 1 in making the hose, and the eye 4 has a hooked end 7 embedded into the boss 6. The outer end of the hose 1 is closed by the wall 8 formed in making the hose and the hook 5 has a bent portion 9 embedded into the wall 8.

Various changes may be made without departing from the spirit of my invention as claimed.

I claim:

A bath spray comprising a soft flexible hose adapted for attachment at one end to a faucet, perforations adjacent the opposite end, a hook embedded in the extremity of said end, and an eye embedded in the hose adjacent said end, for connecting the ends of said perforated portion to form a loop.

In testimony whereof I have signed my name to this specification.

MARY F. CHEVALIER.